No. 819,973. PATENTED MAY 8, 1906.
N. H. BLOOM.
RIDING ATTACHMENT FOR AGRICULTURAL IMPLEMENTS.
APPLICATION FILED FEB. 9, 1905.
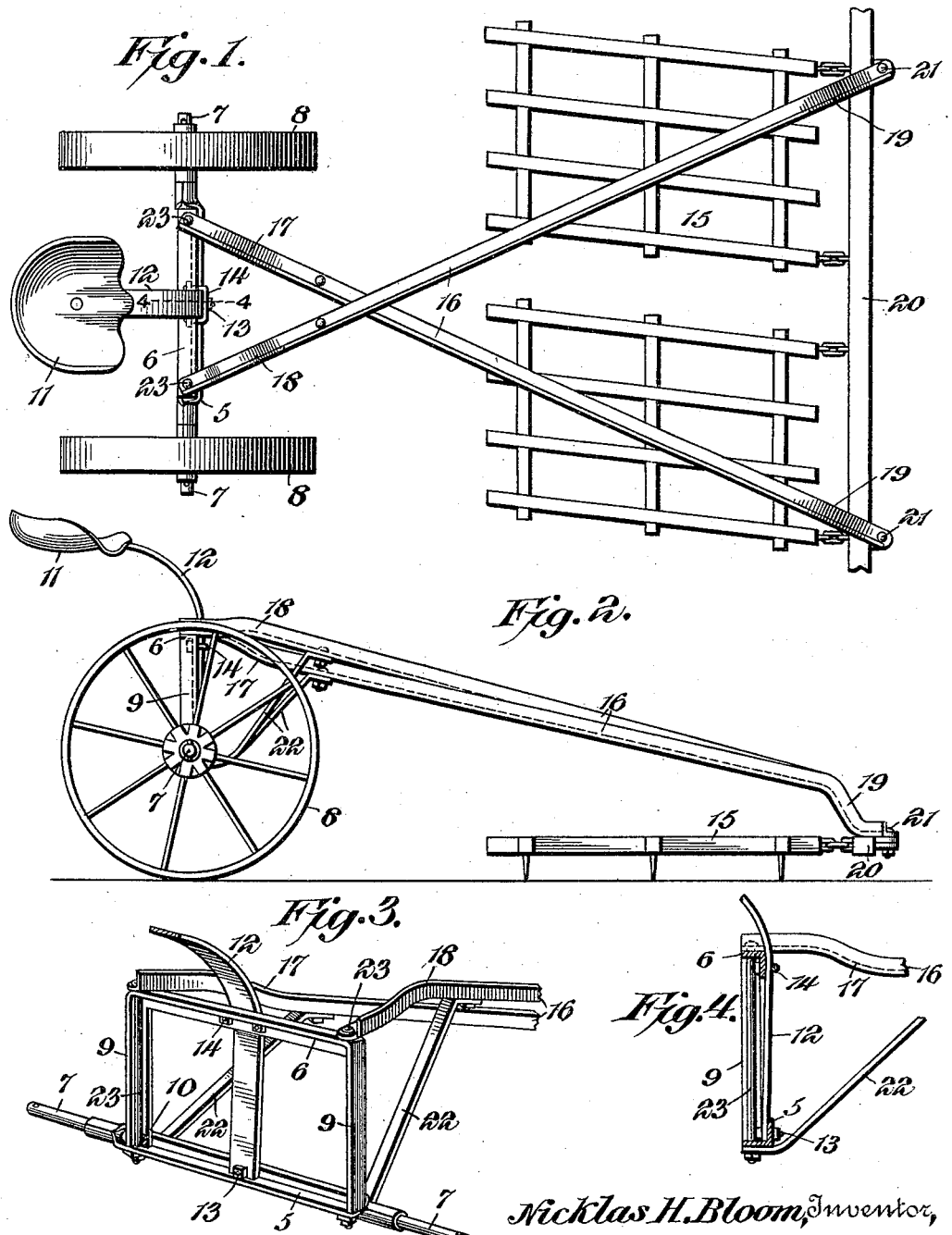

UNITED STATES PATENT OFFICE.

NICKLAS H. BLOOM, OF NASHUA, IOWA.

RIDING ATTACHMENT FOR AGRICULTURAL IMPLEMENTS.

No. 819,973.     Specification of Letters Patent.     Patented May 8, 1906.

Application filed February 9, 1905. Serial No. 244,926.

*To all whom it may concern:*

Be it known that I, NICKLAS H. BLOOM, a citizen of the United States, residing at Nashua, in the county of Chickasaw and State of Iowa, have invented a new and useful Riding Attachment for Agricultural Implements, of which the following is a specification.

This invention relates to that type of attachment arranged to be secured to a harrow or other agricultural implement and providing a wheel-supported seat for the driver of said implement.

One of the principal objects of the present case is to provide an attachment of the above character which will more readily and properly follow the implement, particularly when turns are being made, at the same time providing a structure that is comparatively simple and one that can be inexpensively manufactured.

The preferred embodiment of the invention is illustrated in the accompanying drawings, wherein—

Figure 1 is a top plan view of the attachment, showing the same applied to a harrow. Fig. 2 is a side elevation of the same. Fig. 3 is a detail perspective view of the rear portion of the machine, the wheels being removed; and Fig. 4 is a detail sectional view on the line 4 4 of Fig. 1.

Similar reference-numerals designate corresponding parts in all the figures of the drawings.

In the embodiment illustrated a supporting-frame is employed consisting of an axle 5 and an arch frame-bar 6. The axle is preferably made of angle-iron, the ends of which are bent about and secured to spindles 7, on which ground-wheels 8 are journaled. The arch-bar 6 is also preferably constructed of angle-iron, having upright legs 9, the lower ends of which rest upon the horizontal flange of the axle and are secured thereto by bolts 10 passing through the upright flange of said axle and through the adjacent flanges of said legs. A seat 11 is supported upon this upright frame by means of a yielding standard 12, that extends in front of the cross-piece of the arch-bar 6 and has its lower end disposed in rear of the upstanding flange of the axle, said lower end being secured to said flange by a suitable bolt 13. A clip 14 may be employed for securing the standard to the cross-piece of the arch-bar, as shown. For the purpose of attaching this wheeled frame to an agricultural implement—as, for instance, a harrow 15—reach-bars 16 are employed, preferably formed of angle-iron, said bars being separate from each other and crossed, one of the bars being bent downwardly at its rear end, as shown at 17, the other being bent upwardly, as shown at 18, so that said bars will not materially interfere with each other. The rear ends of the bars rest upon the cross-piece of the arch frame-bar 6, while their front ends are downturned, as shown at 19, and are adapted to be secured to a harrow-bar 20 by suitable pivot-bolts 21. Downwardly and rearwardly extending braces 22 are respectively secured at their upper ends to the rear portions of the reach-bars and have their rear lower ends located beneath the axle. Pivot-bolts 23 connect the rear ends of the reach-bars and braces 22 to the frame, said pivot-bolts passing through the rear ends of the reach-bars, downwardly through the opposite portions of the arch-bar, through the axle, and through the rear ends of the braces.

By means of this structure it will be noted that each end portion of the supporting-frame is pivotally connected to the opposite portion of the harrow or other agricultural implement. Thus, while the frame will be drawn in rear of the implement and properly follow the same, when a turn is being made said frame will also be turned positively with respect to the implement and will not only not interfere with the turn of the implement, but will make a comparatively short turn, being kept at all times out of the way of the harrow and never causing any side drafts upon the same. Moreover, it will be observed that the structure is comparatively simple, so that it may be cheaply manufactured, and at the same time is strong and rigid to withstand the rough usage to which it is necessarily subjected.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what

I claim as new, and desire to secure by Letters Patent, is—

1. In a riding attachment of the class described, the combination with a frame including an axle of angle-iron and axle-spindles projecting beyond the same, the terminals of the angle-iron being bent about and secured to the inner ends of the spindles, of wheels journaled on the spindles, a seat supported on the frame, and means for connecting the frame to an agricultural implement.

2. In a riding attachment of the class described, the combination with an axle, of wheels journaled thereon, an upright frame secured to the axle, a seat mounted on the frame, and crossed bars independently secured to the opposite side portions of the frame.

3. In a riding attachment of the class described, the combination with an axle, of wheels journaled thereon, an arch-bar mounted on the axle, a seat supported by said axle and arch-bar, and crossed reach-bars independently secured to the opposite side portions of the arch-bar.

4. In a riding attachment of the class described, the combination with a supporting-frame comprising an axle and an upright arch-bar mounted thereon, of wheels journaled on the axle, and forwardly-extending crossed reach-bars pivoted at their rear ends to the opposite portions of the arch-bar, said reach-bars being arranged to be secured at their front ends to an agricultural implement.

5. In a riding attachment of the class described, the combination with an axle of angle-iron having a substantially horizontal flange and also having spindles at its ends, of wheels journaled on the spindles, a substantially upright arch-bar of angle-iron having its lower ends bearing upon the horizontal flange, fastening devices passing through said ends and the upright flange of the axle, a seat having a standard connected to the arch-bar and to the axle, and means for connecting the frame to an agricultural implement.

6. In a riding attachment of the class described, the combination with a supporting-frame comprising an axle of angle-iron having rounded spindles at its ends and an arch-bar of angle-iron having its terminal portions secured to the axle between the spindles and extending above said axle, of wheels journaled on the spindles outside the arch-bar, a seat-standard secured to the axle and the upper portion of the arch-bar, and means for pivotally connecting the opposite portions of the frame to an agricultural implement.

7. In a riding attachment of the class described, the combination with an upright frame including an axle and an arch-bar located above the axle, of reach-bars independently pivoted to the arch-bar, and braces independently pivoted to the axle and connected respectively to the reach-bars.

8. In a riding attachment of the class described, the combination with a supporting-frame comprising a transverse axle of angle-iron having spindles at its end and an arch-bar of angle-iron secured at its lower ends to the axle and extending above the same, of wheels journaled on the spindles, a seat having a standard secured to the arch-bar and to the axle, crossed reach-bars having their rear ends pivoted to the opposite portions of the arch-bar, means for connecting the front ends of the reach-bars at separated points to an agricultural implement, braces secured to the reach-bars and having their lower ends located adjacent to the axle, and pivot-bolts connecting the rear ends of the reach-bars and the rear lower ends of the braces to the frame.

In testimony that I claim the foregoing as my own I have hereto affixed my signature in the presence of two witnesses.

NICKLAS H. BLOOM.

Witnesses:
R. F. WENTWORTH,
GEO. R. HALL.